(12) United States Patent
Taherzadehboroujeni et al.

(10) Patent No.: US 9,071,362 B1
(45) Date of Patent: Jun. 30, 2015

(54) NOISE-TOLERANT OPTICAL MODULATION

(71) Applicants: Mahmoud Taherzadehboroujeni, Kanata (CA); Shahab Oveis Gharan, Nepean (CA); Kim B. Roberts, Ottawa (CA)

(72) Inventors: Mahmoud Taherzadehboroujeni, Kanata (CA); Shahab Oveis Gharan, Nepean (CA); Kim B. Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 195 days.

(21) Appl. No.: 13/655,497

(22) Filed: Oct. 19, 2012

(51) Int. Cl.
*H04B 10/04* (2006.01)
*H04B 10/516* (2013.01)

(52) U.S. Cl.
CPC .................................... *H04B 10/516* (2013.01)

(58) Field of Classification Search
CPC ............. H04B 10/118; H04B 10/1123; H04B 10/1125; H04B 10/1127
USPC .................................. 398/118, 121, 124, 125
See application file for complete search history.

(56) References Cited

U.S. PATENT DOCUMENTS

2004/0258177 A1* 12/2004 Shen et al. ..................... 375/308
2007/0253496 A1* 11/2007 Giannakis et al. ............ 375/260
2009/0135926 A1* 5/2009 Tsouri et al. .................. 375/260
2010/0002751 A1* 1/2010 Dent .............................. 375/141

OTHER PUBLICATIONS

Bülow, "Polarization QAM Modulation (POL-QAM) for Coherent Detection Schemes", Alcatel-Lucent. Bell Labs, OSA/OFC/NFOEC 2009, Stuttgart, Germany, pp. 1-3.
Agrell, et al., "Power-Efficient Modulation Formats in Coherent Transmission Systems", Journal of Lightwave Technology, Vol. 27, No. 22, Nov. 15, 2009, pp. 5115-5126.
Batshon, et al., "Beyond 240 Gb/s per Wavelength Optical Transmission Using Coded Hybrid Subcarrier/Amplitude/Phase/Polarization Modulation", IEEE Photonics Technology Letters, vol. 22, No. 5, Mar. 1, 2010, pp. 299-301.
Ip, et al., "Coherent Detection in Optical Fiber Systems", Optical Society of America 2007.
Djordjevic, et al., "Alamouti-type polarization-time coding incoded-modulation schemes with coherent detection", Published Aug. 26, 2008, Sep. 1, 2008 / vol. 16, No. 18 / Optics Express 14163, USA, pp. 1-10.
Sloane, "Tables of Sphere Packings and Spherical Codes", IEEE Transactions of Information Theory, vol. IT27, No. 3, May 1981, pp. 327-338.

* cited by examiner

*Primary Examiner* — Dzung Tran
(74) *Attorney, Agent, or Firm* — Kent Daniels; Daniels IP Services Ltd.

(57) ABSTRACT

A method of transmitting data. The method comprises preliminarily providing a modulation scheme comprising an N-symbol constellation defined in an M-dimensional space, wherein $N<2^M$, and a composite distance between a given pair of symbols within the constellation increases with increasing Hamming distance between data words encoded in each of those symbols. During run-time, a data signal to be transmitted is encoded as symbols of the constellation, and modulated onto at least M dimensions of a carrier light in accordance with the symbols.

23 Claims, 8 Drawing Sheets

Figure 6C
Y-Pol Even

Figure 6D
Y-Poll Odd

| word | Hamming Distance | Angle $\phi$ |
|---|---|---|
| 0000 | 0 | 0 |
| 0001<br>0010<br>0100<br>1000 | 1 | $\theta \; \left(\theta \leq \dfrac{\pi}{2}\right)$ |
| 0011<br>0101<br>1001<br>0110<br>1010<br>1100 | 2 | $\dfrac{\pi}{2}$ |
| 0111<br>1011<br>1101<br>1110 | 3 | $\pi - \theta$ |
| 1111 | 4 | $\pi$ |

NOISE-TOLERANT OPTICAL MODULATION

CROSS-REFERENCE TO RELATED APPLICATIONS

This is the first application filed in respect of the present invention.

FIELD OF THE INVENTION

The present application relates generally to management of communications systems, and more specifically to techniques for noise tolerant optical modulation.

BACKGROUND

Figure 1:
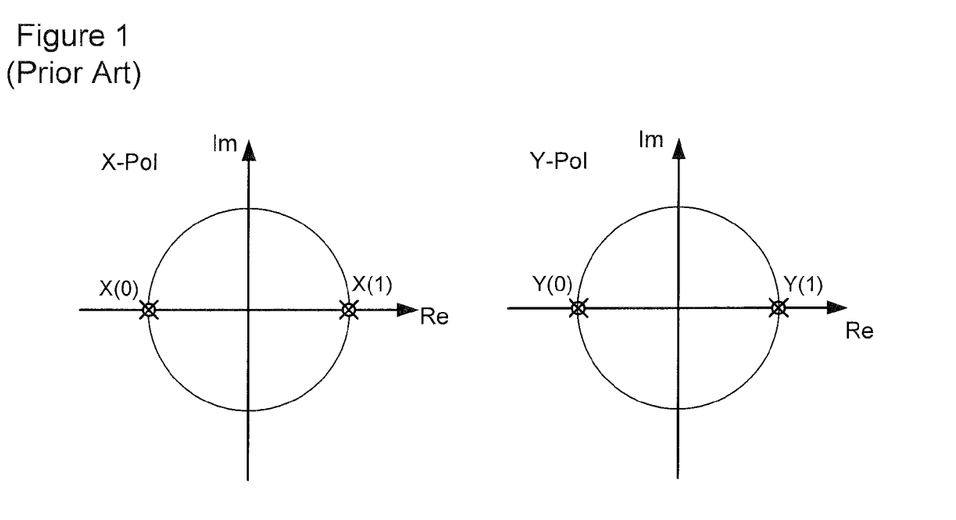
FIG. 1 illustrates a dual-polarization BPSK modulation constellation in the Real (Re)/Imaginary (Im) plane.

For achieving long distance optical signal transmission, at moderate spectral efficiencies, dual polarization Binary Phase Shift Keying (DP-BPSK) and coherent reception are commonly used. As is known in the art, BPSK encodes a single bit value ("0" or "1") onto an optical carrier by modulating the carrier phase between two constellation points, that are separated by 180°. Dual polarization BPSK achieves a spectral efficiency of 2-bits per symbol period (baud), by independently modulating bits onto orthogonal polarizations of the optical carrier. This is illustrated in FIG. 1, which shows the BPSK constellation mapped onto the Real (Re)-Imaginary (Im) plane of each of the X- and Y-polarizations.

Figure 2:
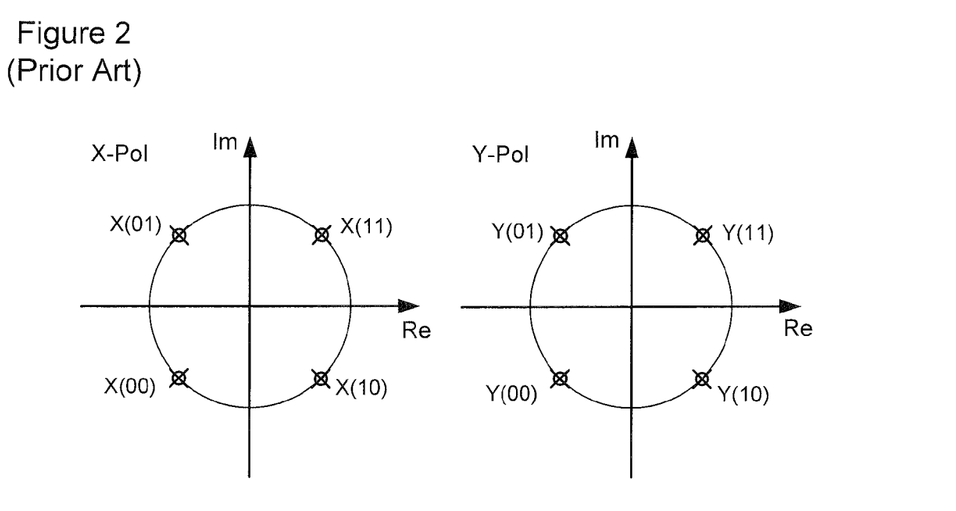
FIG. 2 illustrates a dual-polarization QPSK modulation.

As is known in the art, other modulation schemes enable increased numbers of bits to be encoded into a symbol. For example, Quadrature Phase Shift Keying (QPSK) enables two bits to be encoded on each polarization, and thus four bits per baud for dual polarization DP-QPSK, by using a symmetrical 4-point constellation as may be seen in FIG. 2. Other modulation schemes, such as Quadrature Amplitude Modulation (QAM) achieve even higher numbers of bits per symbol by modulating both the phase and amplitude of the carrier. However, as the number of encoded bits-per-symbol increases, the Euclidian distance between neighbouring constellation points decreases. For example, in the BPSK constellations shown in FIG. 1, each constellation point is separated from its neighbour by a Euclidean distance corresponding to 180°. On the other hand, in the QPSK constellations shown in FIG. 2, each constellation point is separated from its neighbour by a Euclidean distance corresponding to 90°. The reduced separation between adjacent constellation points results in a corresponding decrease in noise tolerance.

Because BPSK maximizes the Euclidian distance between adjacent points in the constellation, it is favoured for long distance transmission (for example under-sea fiber links) and other links having a low signal-to-noise ratio, in spite of the higher spectral efficiency achievable using other modulation schemes. The use of dual polarization BPSK (DP-BPSK) increases spectral efficiency, but is vulnerable to polarization-dependent impairments, such as Polarization Dependent Loss (PDL).

"*Polarization QAM Modulation (POL-QAM) for Coherent Detection Schemes*", H. Bulow, OSA/OFC/NFOEC 2009, describes the use of a sphere packing constellation in the four optical dimensions (XI, XQ, YI, and YQ, representing I and Q axes of each of the X- and Y-polarizations). This constellation has 24 constellation points which encodes a little more than four bits per symbol.

"*Power-Efficient Modulation Formats in Coherent Transmission Systems*" Agrell et al, Journal Of Lightwave Technology, Vol. 27, No. 22, Nov. 15, 2009, describes a three bit per symbol constellation because of its performance at very high signal to noise ratios. In FIG. 6 they also show a point for a tetrahedron constellation that encodes two bits per symbol, that also works well at very high signal to noise ratios. However, modern coherent optical transmission systems typically operate at very low signal to noise ratios with forward error correction able to correct several percent errors. Cross polarization modulation also can be severe.

"*Beyond* 240 *Gb/s per Wavelength Optical Transmission Using Coded Hybrid Subcarrier/Amplitude/Phase/Polarization Modulation*", Djordjevic et al, IEEE Photonics Technology Letters, Vol. 22, No. 5, Mar. 1, 2010, describes modulating codes onto three of the four optical dimensions, expressed as three stokes parameters. However, as this leaves one dimension unused it has reduced performance.

Techniques that enable improved spectral efficiency at low signal-to-noise ratios remain highly desirable.

SUMMARY

An aspect of the present invention provides a method of a method of transmitting data. The method comprises preliminarily providing a modulation scheme comprising an N-symbol constellation defined in an M-dimensional space, wherein $N<2^M$, and a composite distance between a given pair of symbols within the constellation increases with increasing Hamming distance between data words encoded in each of those symbols. During run-time, a data signal to be transmitted is encoded as symbols of the constellation, and modulated onto at least M dimensions of a carrier light in accordance with the symbols.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present application provides techniques for noise tolerant data transmission. In accordance with the present techniques, an encoding scheme is defined in which an N-symbol constellation is defined in an M-dimensional space, where $N<2^M$, and a composite distance between a given pair of symbols within the constellation increases with increasing Hamming distance of M-bit data words encoded in each symbol. In some embodiments, $N<2^{0.75*M}$. Each symbol of the constellation can encode $b=\log_2(N)$ bits of data.

A convenient visualization of the M-dimensional constellation is to consider a set of orthogonal 2-dimensional frames, each of which contains a respective 2-D projection of the constellation. In this case, the respective images (projections) of any two frames are related to each other by a rotation of the constellation about at least one axis of the M-dimensional space. Each frame may be associated with the Re-Im (or, equivalently, the In-phase-Quadrature) plane of a linearly polarized optical carrier light, and so used in a transmitter to transmit data symbols by suitable modulation of the amplitude and phase of the carrier light. Similarly, the frame associated with a given transmitted polarization can be used in a coherent receiver to detect and decode data symbols of the constellation. By suitable selection of the rotation axes, any two constellation points that have a small Euclidian separation in one frame will have a large Euclidian separation in at least one other frame. Because the separation of any two constellation points is large in at least one frame, encoded $b=\log_2(N)$-bit data symbols can be unambiguously detected in a coherent receiver, by correlating sample streams of each transmitted polarization to the associated frame(s), even in cases where signal-to-noise ratio is very low. Further, since each frame contains every point of the constellation, data recovery is highly tolerant of polarization dependent impairments (e.g. PDL).

Figure 3A:
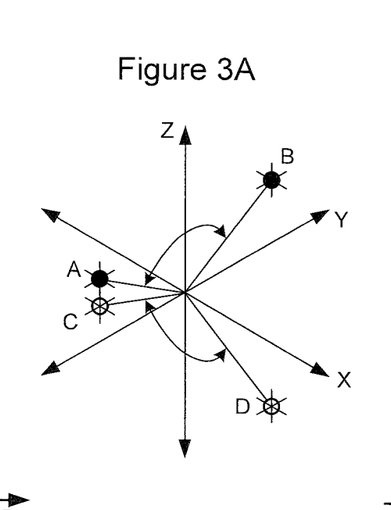
FIGS. 3A-C illustrate a dual-polarization V-constellation with symmetric labelling.
Figure 3B:
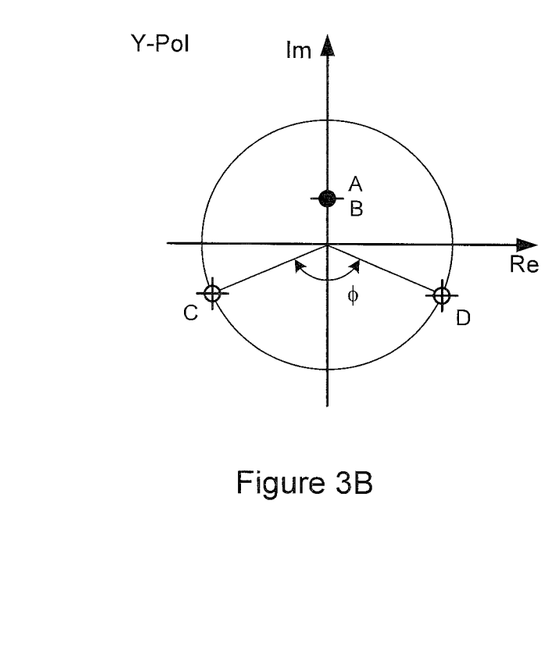
Figure 3C:
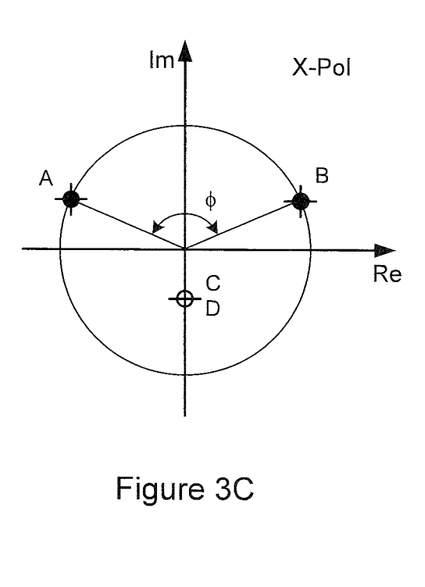

FIGS. 3A-C illustrates an example embodiment comprising a V-constellation with symmetric labelling. As may be seen in FIG. 3A, an M=3-dimensional constellation comprises N=4 symbols (denoted as A, B, C and D), which can be used to encode 2-bit data words. Symbols A and B are co-planar in the 3-D constellation, and are separated from each other by a phase angle $\phi$. Similarly, symbols C and D are co-planar and separated from each other by a phase angle $\phi$. The 3-dimensional constellation is mapped to 2 orthogonal 2-dimensional frames, each of which contains a respective image (projection) of the 3-D constellation. In the illustrated example, FIG. 3B illustrates a frame containing a projection in the X-Z plane of the 3-D constellation, while FIG. 3C illustrates a frame containing a projection in the Y-Z plane of the 3-D constellation. It will also be seen that the projections of FIGS. 3B and 3C are related by a 90° rotation of the 3-D constellation about the Z-axis.

Each of the 2-dimensional frames may be associated with a respective polarization of a dual-polarization continuous wave carrier light. In the illustrated example, the frame is FIG. 3B is associated with the Y-polarization, and the frame is FIG. 3C is associated with the X-polarization. As such, each frame defines the amplitude and phase (or, equivalently, In-Phase and Quadrature) parameters that may be used in a transmitter to modulate each symbol of the constellation onto its associated polarization. A coherent receiver may also use the frame associated with each transmitted polarization to detect and decode symbols modulated on a received optical signal.

Referring to FIG. 3B, in the Y-polarization frame the constellation symbols A and B overlap, and so these symbols would be indistinguishable to a receiver detecting the Y-polarization of the transmitted carrier. On the other hand, constellation symbols C and D are separated from each other by a large Euclidean distance (corresponding to the phase angle of $\phi$), and are also well separated from (overlapping) constellation symbols A and B. As such, a coherent receiver detecting the transmitted Y-polarization can readily detect and recover data encoded in constellation symbols C and D. Conversely, as may be seen in FIG. 3C, in the X-polarization frame the constellation symbols C and D overlap, while constellation symbols A and B are widely separated. Accordingly, a coherent receiver detecting the transmitted X-polarization can readily detect and recover data encoded in constellation symbols A and B. Thus it will be seen that data encoded using the 3-dimensional constellation (FIG. 3A) can be modulated onto a dual-polarization carrier light, and subsequently recovered in a dual-polarization coherent receiver by processing samples of both transmitted polarizations together. All 4 points of this 4-dimensional constellation have equal power. This equal-power property results in minimising nonlinear phase noise (minimal SPM for the signal itself and minimal XPM for other channels).

Figure 4A:
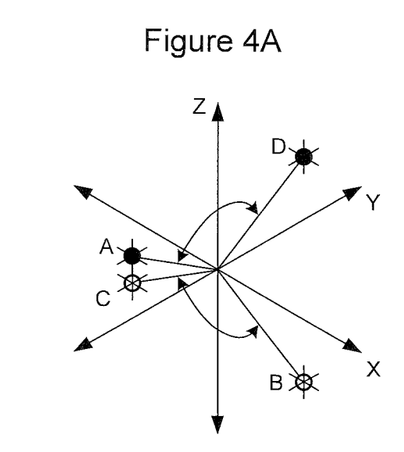
FIGS. 4A-C illustrates a dual-polarization V-constellation with asymmetric labelling.
Figure 4B:
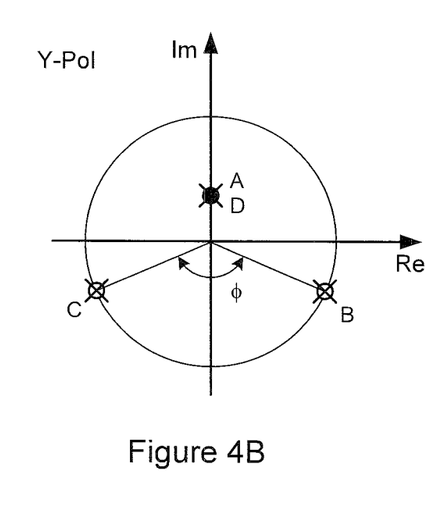
Figure 4C:
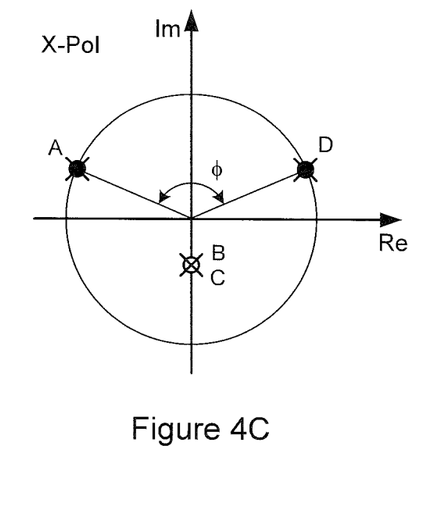

FIGS. 4A-C illustrates a dual-polarization V-constellation with asymmetric labelling. This constellation is closely similar to that of FIGS. 3A-C described above, but with differing encoding of each symbol in the constellation.

Figure 5A:
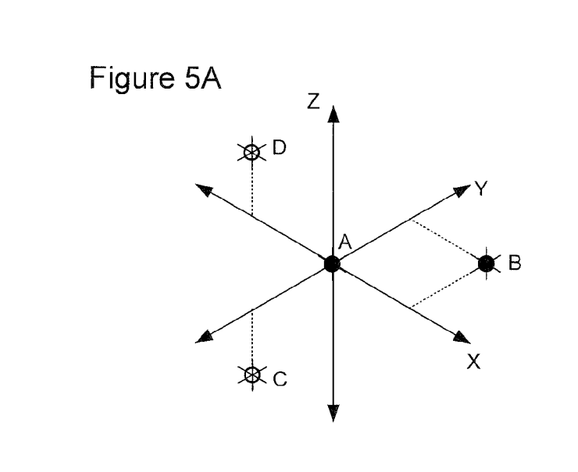
FIGS. 5A-C illustrates an H-constellation.
Figure 5B:
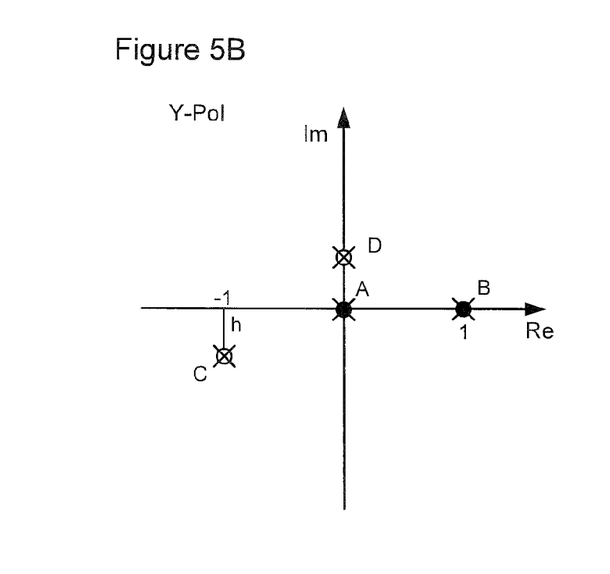
Figure 5C:
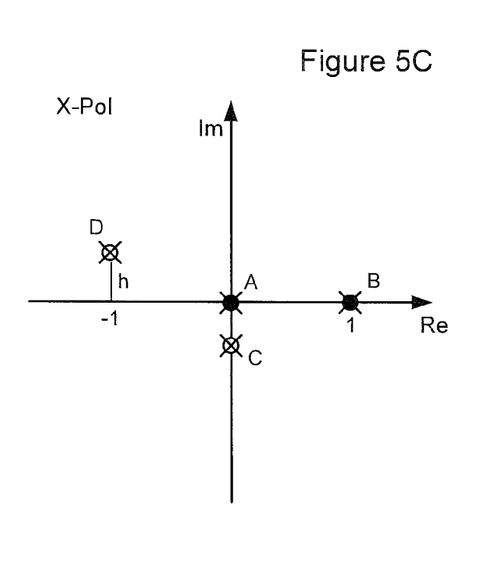

FIGS. 5A-C illustrate an H-constellation. As in the V-constellations of FIGS. 3 and 4, the H-constellation of FIG. 5A is a 3-Dimensional constellation of 4 symbols, each of which encodes a 2-bit data word. FIGS. 5B and 5C illustrate respective 2-dimensional frames of the constellation, which may be associated with respective polarizations and used in a transmitter to modulate data symbols onto a carrier light, and in a coherent receiver to detect data symbols. As may be seen in FIGS. 5B and 5C, in both frames, symbol A is located at the origin, and symbol B is located on the Real axis. Thus a coherent receiver can readily detect and recover data encoded in constellation symbols A and B by processing either of the X- and Y-polarizations of the transmitted carrier. Greater confidence in the data recovery result may be obtained by comparing the symbols detected in both of the two polarizations. On the other hand, it will be seen that data encoded in constellation symbols C and D can be detected and recovered by a coherent receiver detecting the Y- and X-polarizations, respectively, of the transmitted carrier.

A disadvantage of the constellations of FIG. 5 is that one symbol lies at the origin in both frames. This implies that the constellations cannot be transmitted using carrier-suppressed transmission systems.

Figure 6A:
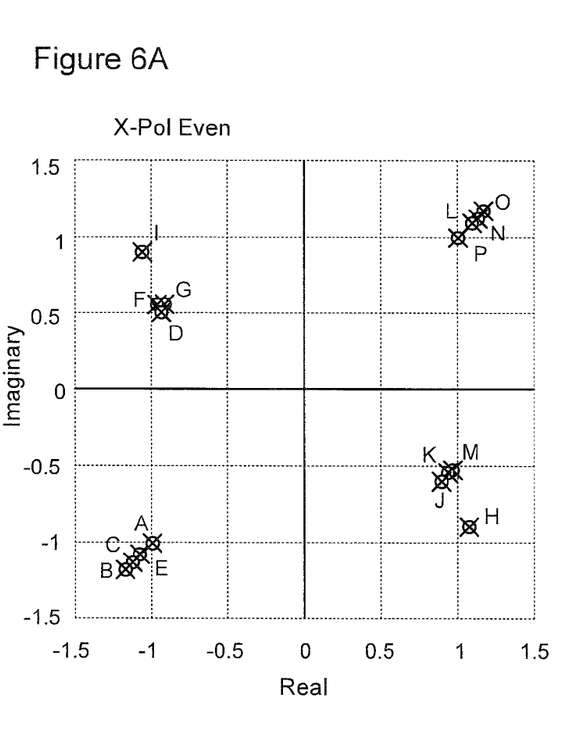
FIGS. 6A-6D illustrate a W-constellation.
Figure 6B:
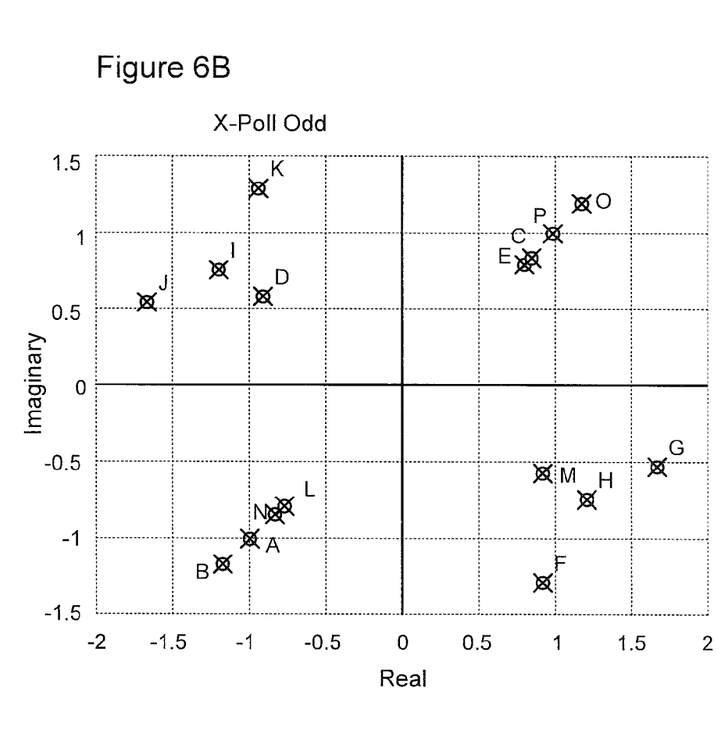
Figure 6C:
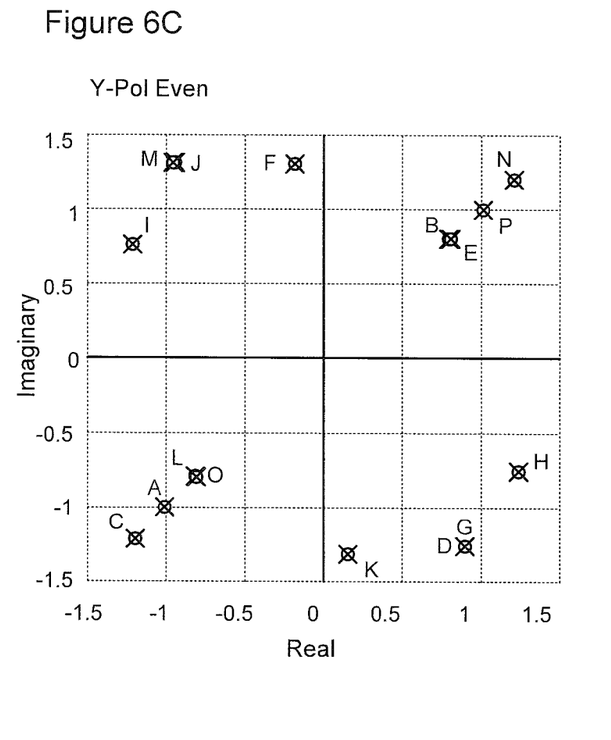
Figure 6D:
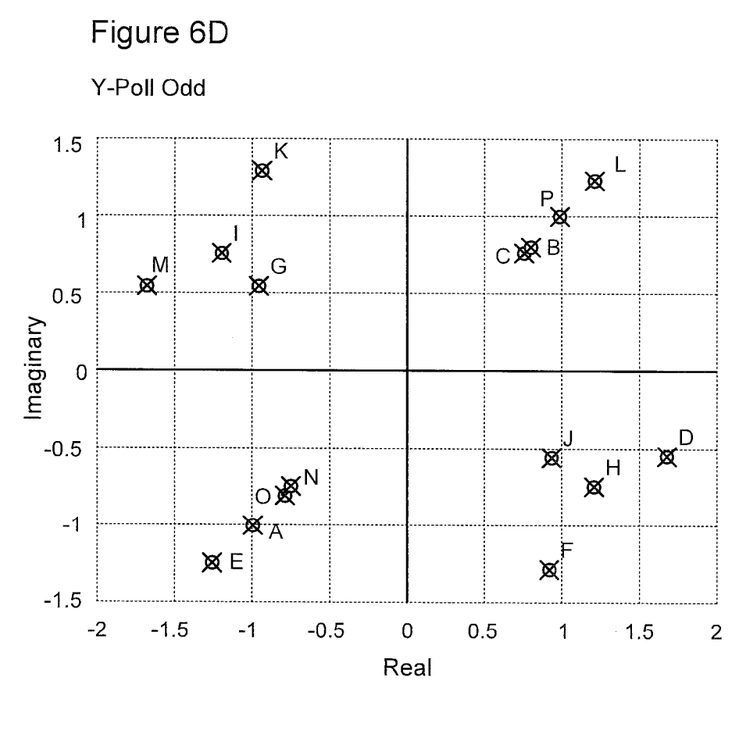

FIGS. 6A-D illustrate respective 2-D projections (frames) of a W-constellation. The W-constellation of FIG. 6A-D comprises 16 symbols (labelled A, B C, . . . P) defined in an 8-Dimensional space. Each symbol encodes a 4-bit data word. FIGS. 6A and 6B illustrate orthogonal 2-dimensional projections of the constellation, which may respectively be associated with odd and even time slots of the X-polarization. Similarly, FIGS. 6C and 6D illustrate orthogonal 2-dimensional frames of the constellation which may respectively be associated with odd and even time slots of the Y-polarization. An advantage of the constellation of FIGS. 6A-D is that none of the symbols lie close to the origin in any of the four projections. Accordingly, the illustrated W constellation is well suited to carrier suppressed transmission systems.

Additionally, it will be seen that any two symbols that have a small Euclidean separation in one frame have a large Euclidean separation in at least one other frame. For example, consider symbols A, B, C, and E. In the frame of FIG. 6A, these four symbols are clustered very close together, and thus would be largely indistinguishable in a coherent receiver. On the other hand, the Euclidean separation between symbol A and B is very large in FIGS. 6C and 6D, so symbol A can be distinguished from symbol B by processing these frames. Similarly, the Euclidean separation between symbol A and C is very large in FIGS. 6B and 6D, so symbol A can be distinguished from symbol C by processing these frames. Continuing, symbols A and E can be distinguished by processing the frames of FIGS. 6B and 6C; symbols B and C can be distinguished by processing the frames of FIGS. 6B and 6C; symbols B and E can be distinguished by processing the frames of FIGS. 7B and 7D, and symbols C and E can be distinguished by processing the frames of FIGS. 6C and 6D. Thus it will be seen that symbols having a small Euclidean separation in one frame have a large Euclidean separation in at least one other frame, and so can be unambiguously detected in a coherent receiver.

Figure 7:
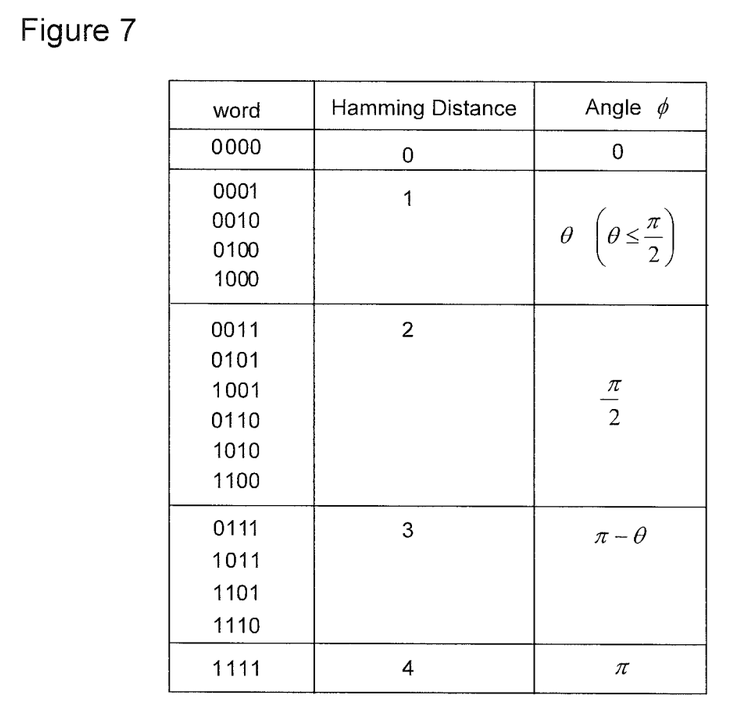
FIG. 7 is a table illustrating a relationship between Hamming distance and phase angle in the constellation of FIGS. 6A-6D.

In some embodiments, data detection performance may be improved by suitable selection of the phase angle φ between co-planar constellation points and the respective Hamming distance of the data words encoded in the co-planar constellation points. For example, the phase difference φ may be selected to vary with the Hamming distance. In the embodiment of FIGS. 6A-6D, each symbol encodes a 4-bit word. The table of FIG. 7 illustrates the Hamming distance and phase angle φ between "0000" and each of the other possible 4-bit words. As may be seen in FIG. 7, the phase angle φ increases with increasing Hamming distance. This arrangement is beneficial, in that it helps increase the Euclidean distance between self-similar data words, and thereby increases the likelihood of accurate data recovery in the receiver.

In some embodiments, the respective projection of constellation points in different frames is selected to improve resistance to channel phase distortions such as cross phase modulation (XPM) or laser linewidth distortion. For this purpose, the respective projections in different frames are selected such that the phase angle between a pair of constellation points in one frame is different from the phase angle between that same pair of constellation points in another frame. As an example, in the embodiment of FIGS. 6A-6D, symbol "D" has a phase angle of about π/2 with respect to symbol "A" in two of the frames (FIGS. 6C and 6D), while it has a phase angle of about −π/2 with respect to symbol "A" in the other two frames (FIGS. 6A and 6B). So, if a large positive value phase distortion is added to the transmitted symbol "A" so that it may be confused with symbol "D" in the frames of FIGS. 6C and 6D, it can be distinguished from symbol "D" in the frames of FIGS. 6A and 6B. Similarly, symbols "A" and "C" are separated by an angle of 0 in two frames, but are separated by an angle of a in the other two frames.

In some embodiments, a multi-dimensional rotation is applied to the constellation between frames distributed across time, polarization and Re-Im (or I-Q) axes of a transmitter, so as to mitigate degradation due to unknown time-independent polarization distortions such as PDL or Cross Polarization Modulation (XPolM) in a downstream optical communication system. For this purpose, the constellation may be rotated across time such that any two constellation points that have a given polarization orientation vector with respect to each other in one time-frame, have a much different polarization orientation vector with respect to each other in the other time-frame. As an example, in the embodiment of FIGS. 6A-6D, symbol "J" has a different polarization orientation vector with respect to symbol "A", when it is viewed in Even and (kid time frames independently; For the even time-frames (FIGS. 6A and 6C), symbol "J" has an orientation vector with angle [π/2, −π/2] with respect to symbol "A", while in the odd time-frames (FIGS. 6B and 6D), it has an orientation vector with a different angle [−π/2, π/2]. So, they can be distinguished from each other under unknown or unpredicted channel polarization distortions.

In some embodiments, the multi-dimensional rotations applied to the constellation between frames distributed across time and polarization are selected so as to minimize signal power variations between different frames to reduce the nonlinear power. As an example, in embodiments of FIGS. 6A-6D, a multi-dimensional rotation is applied to minimize power variations between different polarization and time frames to reduce the effective nonlinearity (SPM, XPM, XPolM, etc.) caused by the constellation set. As another example, in some embodiments, we can apply a (16, 8) Reed-Muller code as a multi-dimensional rotation of a W-constellation having φ=π/2, in order to minimize power variations between different constellation points and also between different frames.

In the foregoing description, a set of 2 or more frames is provided, each of which is associated with a respective polarization and/or time slot of the carrier light. It will be appreciated that the use of frames is merely a convenient way to visualize the association between a given 2-D projection of the M-dimensional constellation and a respective polarization/time slot of the carrier light. As such, it will be seen that the use of frames is not essential, and is not limitative of the scope of the appended claims.

In the foregoing description, the separation between a given pair of constellation points is different in different frames, and this feature is used to enable the two constellation points to be distinguished from one another. For convenience, the separation being discussed is in fact the "apparent separation", as it appears in the various 2-D projections of the constellation. More generally, it is possible to consider a "composite distance" between points within the M-dimensional constellation. The "composite distance" may be defined in terms of geometric (e.g. Euclidean), angular or radial components spanning any desired number of dimensions within the M-dimensional space, or non-linear functions (such as, for example, correlation or anti-correlation) of these components. It is advantageous for the composite distance squared to approximate the log of the probability of such an excursion in the presence of all of the noises, nonlinearities, and distortions that are being considered for a given optical link. It is generally desirable for the composite distance between any two constellation points to increase with increasing Hamming distance, to mitigate the effect of the greater number of bit errors from that type of symbol error.

For example, in the "W" constellation of FIGS. 6 and 7, constellation points are separated by a composite distance which includes Euclidean distance and the angular distance components. By reducing the angle φ in the Table of FIG. 7, it is possible to support larger Euclidean distance for pairs of constellation points with a large Hamming distance. Similarly, the (multi-dimensional) angular distance can be increased for pairs of constellation points with large Hamming distance values.

Alternatively, the "composite distance" may be defined as a nonlinear function (such as, for example, correlation or anti-correlation) of distance components. For example, the possible correlation or anti-correlation between different angular distance values in different Re-Im subspaces (projections) may be used to determine the "composite distance". An example of such a design is an 8 dimensional rotation of a "W" constellation, in which the pairs of the constellation points that have the same sign in their relative phase values in different 2-dimensional subspaces will have a smaller "composite distance".

In some embodiments, the "composite distance" includes the radial distance values as a component. As an example, in embodiment of FIGS. 3B-C, the radial distance value is larger in each 2-dimensional subspace for pairs of constellation points that have a large Hamming distance value (the pair (A, D) or the pair (B, C)).

An example embodiment of a design based on "composite distance" is the "V" constellation (in FIGS. 3A-3C and 4A-4C) in which 4 constellation points are designed in 3 dimensional space and the composite distance is a function of Euclidean distance and the angular distance values in each 2-D (Re-Im) subspace. Here, by increasing the angle ϕ (shown in FIGS. 3B-C, 4B-C), both the Euclidean distance values and the angular distance values will be increased for pairs of constellation points that have a large value of Hamming distance.

In some embodiments, the "composite distance" may include a polarization angle component. As an example, we can apply an operation such as an 8 dimensional rotation to the "W" constellation such that the constellation points pairs with a larger Hamming distance values have a much higher polarization angle value.

Figure 8:
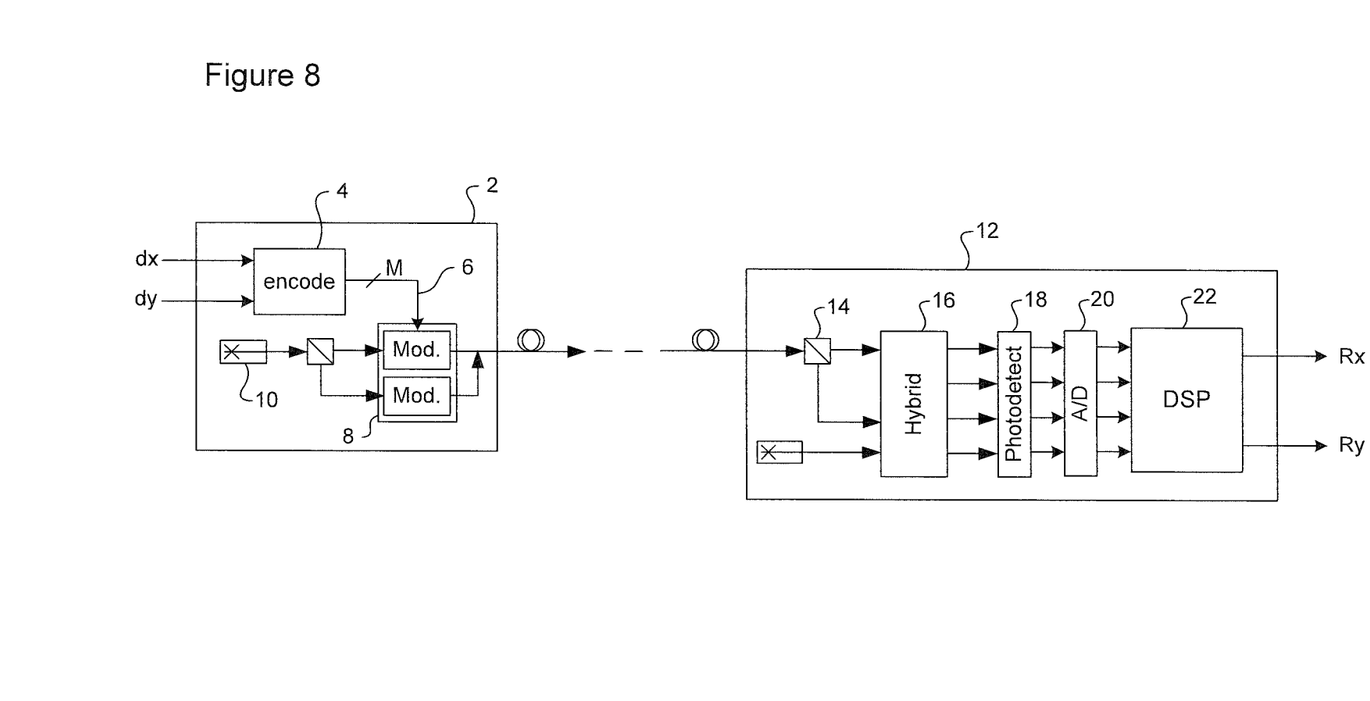
FIG. 8 is a block diagram schematically illustrating elements of a transmitter implementing methods in accordance with the present invention.

FIG. 8 illustrates an optical communications system in which techniques in accordance with the present disclosure may be implemented. In the optical communications system of FIG. 8, a transmitter 2 generally comprise an encoder 4 for encoding a pair of data signals (dx and dy) using the M-dimensional constellation to generate a set of M drive signals 6. The drive signals are then supplied to a modulator 8 for modulating respective dimensions of a continuous wave (CW) carrier light in accordance with the drive signals. In the example of FIG. 8, a pair of data signals (dx and dy) may be encoded as M=4 drive signals, which are then used to modulate two dimensions (e.g. phase and amplitude, or In-phase and Quadrature) of each orthogonal polarization of the carrier light. The CW carrier light is typically generated by a laser 10 in a manner known in the art, and the modulator may be implemented using any of a variety of known modulator devices, such as phase modulators, variable optical attenuators Mach-Zehnder interferometers etc. The modulated optical signal appearing at the output of the modulator is transmitted through an optical fiber link to a coherent receiver.

A receiver 12 configured to receive and detect the transmitted data signals may conveniently be provided as a coherent receiver, which includes a polarization beam splitter 14 for splitting the received optical signal into received X and Y polarizations, an optical hybrid 16 for mixing the X and Y polarizations with a local oscillator light, and a set of photodetectors 18 for detecting the optical power of each of the mixing products generated by the optical hybrid 16. An A/D) converter block 20 samples each photodetector current, and the resulting sample streams—each of which represents a respective one of the modulated dimensions of the carrier light—are processed by a Digital Signal Processor (DSP) 22 in accordance with the M-dimensional constellation to generate recovered signals Rx and Ry that correspond with the transmitted data signals dx and dy.

The embodiments of the invention described above are intended to be illustrative only. The scope of the invention is therefore intended to be limited solely by the scope of the appended claims.

We claim:

1. A method of transmitting data, the method comprising:
an encoder encoding a data signal to be transmitted as symbols of an N-symbol constellation defined in an M-dimensional space, wherein $N<2^M$, and a composite distance between a given pair of symbols within the constellation increases with increasing Hamming distance between data words encoded in each of those symbols; and
a modulator modulating at least M dimensions of a carrier light in accordance with the symbols.

2. The method of claim 1 wherein the composite distance includes any one or more of an angular component and a Euclidean component.

3. The method of claim 1 wherein the composite distance includes a radial component.

4. The method of claim 1 wherein the composite distance includes an anti-correlation component.

5. The method of claim 4 wherein the anti-correlation component is with respect to phase angle.

6. The method of claim 4 wherein the anti-correlation component is with respect to a polarization angle.

7. The method of claim 1 wherein modulating at least M dimensions of the carrier light comprises modulating each polarization of the carrier light in accordance with a respective one of at least two 2-dimensional projections of the constellation.

8. The method as claimed in claim 7 wherein the at least two 2-dimensional projections of the constellation are distributed across any one or more of time, polarization, and I-Q axes of the carrier light.

9. The method as claimed in claim 7, wherein a first one of the at least two 2-dimensional projections is related to a second one of the at least two 2-dimensional projections by a rotation of the constellation about at least one axis of the M-dimensional space.

10. The method as claimed in claim 9, wherein the at least one axis of rotation is selected such that any two constellation points that have a small Euclidian separation in one 2-dimensional projection will have a large Euclidian separation in at least one other 2-dimensional projection.

11. The method as claimed in claim 9, wherein the at least one axis of rotation is selected such that a phase angle between a pair of constellation points in one 2-dimensional projection is different from a corresponding phase angle between the pair of constellation points in another 2-dimensional projection.

12. The method as claimed in claim 9, wherein at least two 2-dimensional projections are associated with respective time-frames, and wherein the at least one axis of rotation is selected such that a given pair of constellation points that have a polarization orientation vector with respect to each other in one time-frame, have a different polarization orientation vector with respect to each other in the other time-frame.

13. The method as claimed in claim 9, wherein the at least one axis of rotation is selected to minimize signal power variations between different 2-dimensional projections.

14. The method as claimed in claim 9, wherein the at least one axis of rotation is selected to increase radial distance values between constellation points within the at least one 2-dimensional projection.

15. The method as claimed in claim 7, wherein the at least two 2-dimensional projections comprise an even time-frame associated with a corresponding even time slot, and an odd time-frame associated with a corresponding odd time slot, and wherein the respective projections of each of the even and odd time-frames are selected such that a first symbol has a different polarization orientation vector with respect to a second symbol in each of the even and odd time-frames.

16. The method as claimed in claim 7, wherein the at least two 2-dimensional projections are selected such that a phase angle between a pair of constellation points in one projection is different from the phase angle between that same pair of constellation points in another projection.

17. The method as claimed in claim 1, wherein a phase angle between co-planar symbols of the constellation is selected to vary with Hamming distance between $b=\log_2(N)$-bit data words encoded in each symbol.

18. A transmitter for transmitting data in an optical communications system, the transmitter comprising:

an encoder configured to encode a data signal to be transmitted as symbols of an N-symbol constellation defined in an M-dimensional space, wherein $N<2^M$, and a composite distance between a given pair of symbols within the constellation increases with increasing Hamming distance between data words encoded in each of those symbols; and a modulator configured to modulate the symbols onto at least M dimensions of a carrier light.

19. The transmitter as claimed in claim 18, wherein the composite distance includes any one or more of:
   an angular component;
   a Euclidean component;
   a radial component; and
   an anti-correlation component.

20. The transmitter as claimed in claim 18, wherein the modulator is configured to modulate each polarization of the carrier light in accordance with a respective one of at least two 2-dimensional projections of the constellation.

21. The transmitter as claimed in claim 20, wherein the at least two 2-dimensional projections of the constellation are distributed across any one or more of time, polarization, and I-Q axes of the carrier light.

22. The transmitter as claimed in claim 20, wherein a first one of the at least two 2-dimensional projections is related to a second one of the at least two 2-dimensional projections by a rotation of the constellation about at least one axis of the M-dimensional space.

23. The transmitter as claimed in claim 20, wherein the at least two 2-dimensional projections comprise an even time-frame associated with a corresponding even time slot, and an odd time-frame associated with a corresponding odd time slot, and wherein the respective projections of each of the even and odd time-frames are selected such that a first symbol has a different polarization orientation vector with respect to a second symbol in each of the even and odd time-frames.

\* \* \* \* \*